United States Patent [19]
Keller

[11] 3,802,352
[45] Apr. 9, 1974

[54] RAILWAY TRUCK WHEEL AND AXLE SET

[75] Inventor: Thomas Charles Keller, Canton, Ohio

[73] Assignee: The Timken Company, Canton, Ohio

[22] Filed: July 13, 1972

[21] Appl. No.: 271,556

[52] U.S. Cl. ............... 105/181, 295/36 A, 295/37, 295/44, 295/49, 308/180
[51] Int. Cl. ........ B61f 3/02, B61f 5/28, B61f 15/12
[58] Field of Search ........ 105/181; 295/36 A, 36 R, 295/37, 44, 45, 46, 47, 48, 49–50; 308/180

[56] References Cited
UNITED STATES PATENTS

| | | | |
|---|---|---|---|
| 52,949 | 3/1866 | Babson | 308/180 |
| 36,790 | 10/1862 | Northrup | 295/44 |
| 1,708,608 | 4/1929 | Edmunds | 295/44 X |
| 1,038,962 | 9/1912 | Rivers | 295/44 X |
| 905,532 | 12/1908 | Hoffmann | 295/49 |
| 935,962 | 10/1909 | Church | 295/44 |

Primary Examiner—Robert G. Sheridan
Assistant Examiner—Howard Beltran
Attorney, Agent, or Firm—Gravely, Lieder & Woodruff

[57] ABSTRACT

A wheel and axle set for a railcar truck includes one wheel fixed to the axle and another wheel loose on the axle so that the latter wheel can rotate relative to the axle. This loose wheel arrangement permits the wheels on opposite sides of the truck to rotate at different speeds as the truck negotiates curved sections of track, and this in turn prevents wheel slippage and greatly reduces rail wear, particularly where the rails are used by heavily loaded trains. The axle is a standard AAR roller bearing axle having raised wheel seats set inwardly from its journals. The fixed wheel is pressed onto one of the wheel seats, while a sleeve is pressed over the other wheel seat. The sleeve serves as a mount for a pair of tapered roller bearings which carry the loose wheel. The two bearings for the loose wheel are indirectly mounted on the sleeve which has a flange at its inner end and a detachable retaining ring at its outer end, and both the flange and ring serve as abutments for the back faces of the indirectly mounted bearing cones. The sleeve is further provided at its outer end with an inwardly directed lip which engages the wheel seat fillet at the outer end of the raised wheel seat. Hence, the lip locates the sleeve on its seat and further prevents the sleeve from moving inwardly under the heavy thrust loading encountered by the wheel flange in negotiating curves.

19 Claims, 3 Drawing Figures

PATENTED APR 9 1974

3,802,352

RAILWAY TRUCK WHEEL AND AXLE SET

BACKGROUND OF THE INVENTION

This invention relates in general to railcar trucks and more particularly to a wheel and axle set therefor which has wheels capable of rotating independently of each other.

In the wheel and axle sets of a typical railcar truck the wheels are press fitted onto the axles and hence the two wheels of each axle rotate at the same velocity. Normally, the treads of the wheels are tapered somewhat to compensate for the fact that one wheel of the axle must roll further than the other wheel when a curved segment of track is negotiated. Despite the tapered tread surfaces on the wheels, some slippage does occur, particularly when sharp curves are encountered, and this slippage causes rail and wheel wear, and further wastes some of the power generated by the locomotive. While these problems are not particularly bothersome where light and moderate car loads are involved, they are a source of major concern where the railcars are heavily loaded and the track has numerous curves. The operators of so-called unit trains which haul ores from mines are plagued perhaps more than others with the slippage problem, since their cars are often heavily loaded and the mines which they service are usually in mountainous regions where curved track is quite frequent. It has been observed that the life of a rail in a curved segment of track used exclusively by heavily loaded trains is approximately one-half that of equivalent rails used by moderately loaded trains. The wear imparts an undulated configuration to the rail surfaces, and it is believed that the undulations are the result of plastic deformation caused by extreme wheel loads and the torsional slip of the wheels. It has further been observed that about 30 percent more tractive effort is required for a heavily loaded car having conventional wheel and axle sets to negotiate a 12° curve than is required for a similarly loaded one equipped with loose wheels as described in this specification.

SUMMARY OF THE INVENTION

One of the principal objects of the present invention is to provide a railcar truck having wheels which do not slip as the truck negotiates curved segments of track. Another object is to provide a railcar truck of the type stated in which the wheels of each wheel and axle set rotate independently of each other. It is a further object to provide a railcar truck of the type stated which is ideally suited for use in heavily loaded trains operated over curved tracks. Still another object is to provide means for mounting a railcar wheel on an axle such that the wheel will rotate relative to the axle. An additional object is to provide a truck which requires less tractive effort to negotiate sharp curves, even when heavily loaded. These and other objects and advantages will become apparent hereinafter.

The present invention is embodied in a railcar truck having a wheel and axle set in which one of the wheels rotates relative to the axle. The so-called loose wheel is mounted on bearing means carried by a sleeve which fits over the axle. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur.

DETAILED DESCRIPTION

Figure 1:
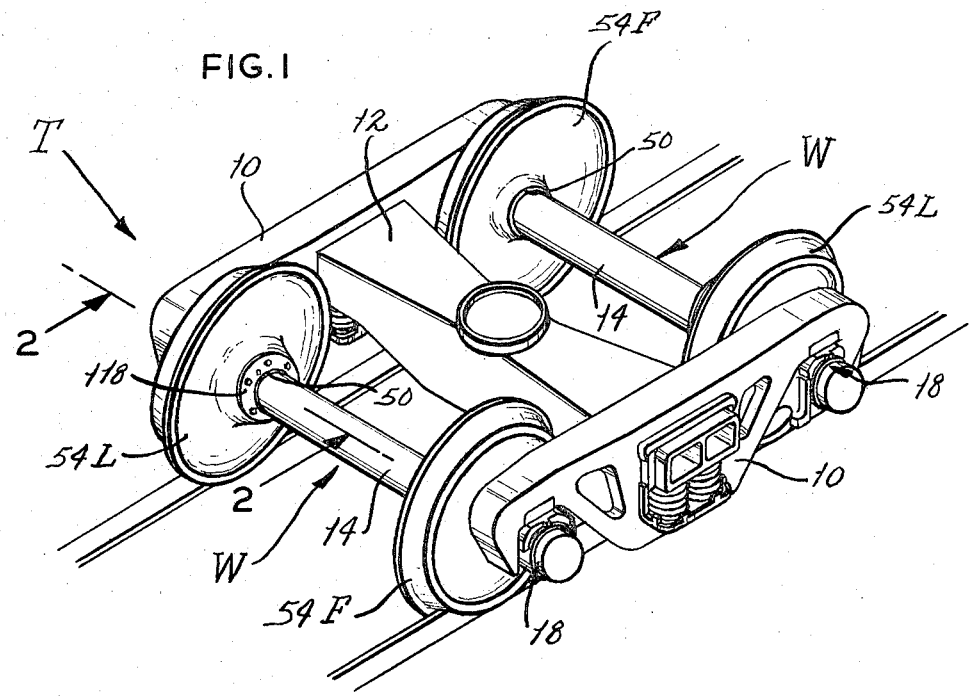
FIG. 1 is a perspective view of a railway car truck provided with improved wheel and axle sets constructed in accordance with and embodying the present invention.
Figure 3:
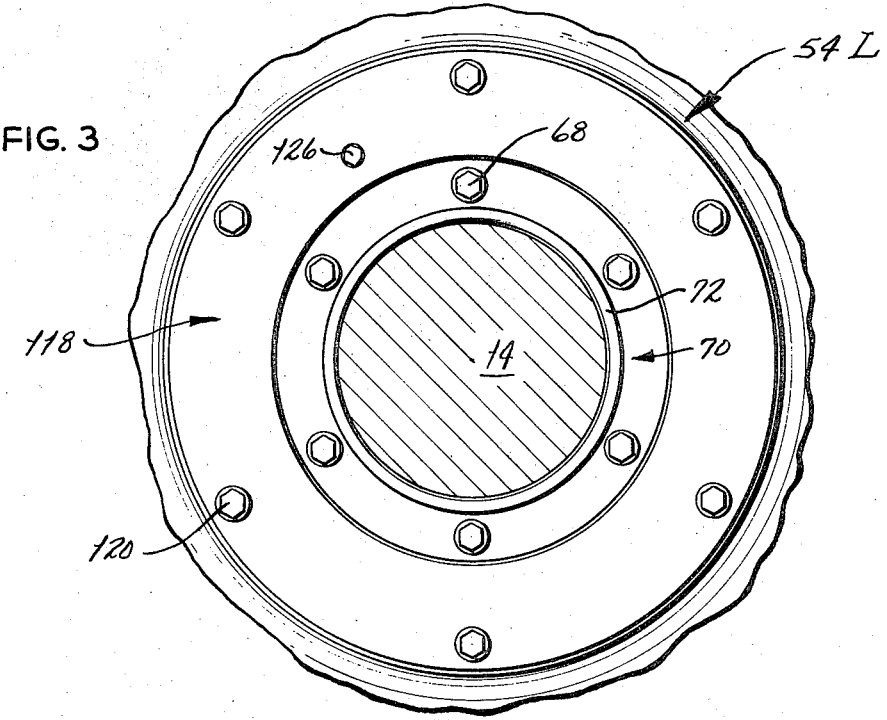
FIG. 3 is a sectional view taken along line 3—3 of FIG. 2.
Figure 2:
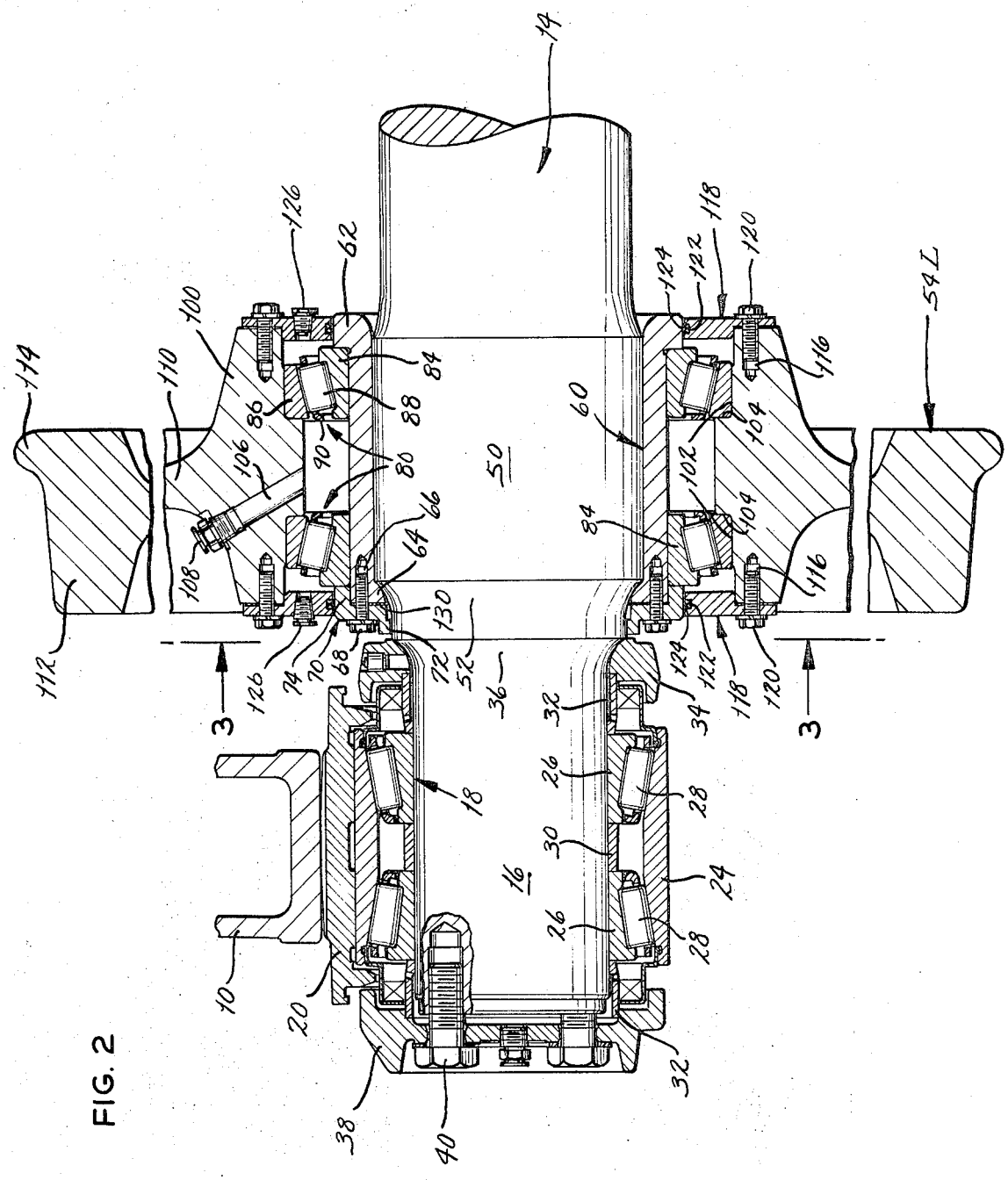
FIG. 2 is a sectional view taken along lines 2—2 of FIG. 1 and showing the loose wheel mounting.

Referring now to the drawings (FIG. 1), T designates a railcar truck including side frames 10 and a bolster 12 interconnecting the side frames 10. The truck T has a pair of wheel and axle sets W. Each wheel and axle set W includes an axle 14 which spans the truck T and at its ends is journaled in the side frames 10. In particular, at each axle 14 is a standard AAR roller bearing axle having its ends turned down in the formation of axle journal 16 (FIG. 2). Fitted over these journals 16 are standard tapered roller journal bearings 18 which are retained in the side frames 10 by means of adapters 20 (FIG. 2). Actually, each bearing 18 includes a double cup 24 fitted to the adapter 20, a pair of cones 26 fitted over the journal 16, tapered rollers 28 arranged in two rows between the cup 24 and cones 26, and a spacer 30 between the cones 26 to provide the bearing 18 with the correct adjustment. The cones 26 of each journal bearing 18 are clamped between a pair of wear rings 32. The inner wear ring 32 fits into a backing ring 34 which is positioned against a journal fillet 36 at the inner end of the axle journal 16. The outer wear ring 32 projects into an end cap 38 which is fastened securely to the end of the axle journal 16 by means of cap screws 40.

The axle 14 is manufactured according to the American Association of Railroads standard specifications and has raised wheel seats 50 located inwardly from the axle journals 16 at the ends thereof. These wheels seats 50 possess a cylindrical configuration and are separated from the axle journal fillets 36 by the curved wheel seat fillets 52. Press fitted over one of the wheel seats 50 (not shown in FIG. 2) is a conventional railcar wheel 54F (FIG. 1), the press fit being effected with conventional manufacturing and assembling techniques. Thus, the wheel 54F is fixed with respect to the axle 14 and accordingly rotates with the axle 14.

Unlike conventional wheel and axle sets, the wheel seat 50 at the other end of the axle 14 has a mounting sleeve 60 (FIG. 2) pressed over it. The mounting sleeve 60 projects a short distance beyond each end of the seat 50, and at its inner end it is provided with a flange 62 which projects radially outwardly and forms an abutment at the end of the cylindrical sleeve surface. The outer end of the sleeve 60, on the other hand, has an inwardly directed lip 64, the inside surface of which is curved and generally conforms to the curvature of the wheel seat fillet 52. Indeed, the inside surface of the lip 64 seats against the wheel seat fillet 52 and thereby serves to locate the mounting sleeve 60 on the wheel seat 50. Once the sleeve 60 is pressed over the wheel seat 50, its outside surface is ground to a prescribed diameter and concentric to the axis of the axle 14.

In addition, the sleeve 60 has a plurality of axially extending threaded bores 66 spaced at equal circumferential intervals around it, and these bores open outwardly toward the adjacent tapered roller journal bearing 18. The outer end face of the sleeve 60 is squared off, and clamped against this end face by means of bolts 68 which thread into the threaded bores 66 is a retaining ring 70. Along its inner margin the ring 70 is provided with an axial projection 72 which extends along the wheel seat fillet 52 and terminates close to the backing ring 34 for the bearing 18. Nevertheless, a small clearance exists between the axial projection 72 and the backing ring 34, and the diameter of the projection 72 is somewhat less than the diameter of the backing ring 34. Outwardly beyond the bolts 68, the retaining ring 70 is provided with another axial projection 74 which projects over the outside surface of the sleeve 60 and forms an abutment at the outer end of the sleeve 60, just as the flange 62 forms an abutment at the inner end of the sleeve 60. The outside diameter of the retaining ring 70 equals the outside diameter of the flange 62.

Mounted on the mounting sleeve 60 and clamped between the flange 62 and the retaining ring 70 at the ends thereof are a pair of single row tapered roller bearings 80. The bearings 80 provide a journal for a loose wheel 54L which, as its name implies, may rotate independently of the axle 14. Each bearing 80 includes a cone 84 press fitted over the sleeve 60, a cup 86 surrounding the cone 84 and fitted into the loose wheel 54L, a plurality of tapered rollers 88 interposed between the cone 84 and cup 86 and engaged with the raceways thereof, and a cage 90 for maintaining the proper spacing between the rollers 88. The bearings 80 are mounted in the indirected configuration, and hence the large diameter ends of the rollers 88, as well as the large diameter ends of the raceways on the cups 86 and cones 84 are presented outwardly toward the ends of the sleeve 60. The cone back face of the outer bearing 80 abuts against the outer axial projection 74 on the retaining ring 70, whereas the cone back face of the inner bearing 80 abuts against the flange 62 on the sleeve 60.

The loose wheel 54L is carried by the tapered roller bearings 80 and includes a central hub 100 having cup seats 102 opening out of the ends thereof. The cup seats 102 are sized for an interference fit with the cups 86, and inwardly terminate at cup shoulders 104. The cups 86 are press fitted into the cup seats 102 until their back faces engage the shoulders 104. The hub 100 is further provided with an oblique bore 106 which extends from the outer surface thereof to the space between the two cup seats 102. At its outer end the oblique bore 106 has a lubricant fitting 108 threaded into it.

In addition, the loose wheel 54L includes a reduced intermediate section 110 which at its inner end merges into the hub 100 and at its outer end merges into a tread section 112 having a wheel flange 114 thereon. The tread section 112 is normally tapered making the wheel conical in nature, but the tread can be straight as on cylindrical wheels. The cup seats 102 are machined concentric to the running surface of the tread section 112.

The end faces of the hub 100 are squared off and opening out of these end faces are threaded bores 116 which extend axially and are spaced at equal circumferential intervals around the hub 100. Fitted against the squared off end faces of the hub 100 are enclosure rings 118 which possess a stepped configuration to enable them to project partially into the hub 100 for the purpose of properly locating the enclosure rings 118 on the hub 100. The enclosure rings 118 are secured against the end faces of the hub 100 by means of bolts 120 which thread into the axial bores 116. The inner enclosure ring 118 is presented directly outwardly from and encircles the flange 62 on the mounting sleeve 60, while the outer enclosure ring 118 is presented directly outwardly from and encircles the retaining ring 70 which is bolted to the mounting sleeve 60. Moreover, both enclosure rings 118 are provided with grooves 122 which open inwardly toward the axis of rotation, and contained within these grooves 122 are elastomeric seals 124 which bear against the outside surfaces of the sleeve flange 62 and retaining ring 70 to prevent the loss of lubricant from the interior of the loose wheel bearing assembly in the hub 100. Threaded into the enclosure rings 118 are vent fittings 126.

To assemble the truck T, the mounting sleeve 60 is first pressed over the wheel seat 50 at the one end of the axle 14 until the inwardly directed lip 64 at the outer end of the sleeve 60 engages the wheel seat fillet 52. Thus, the lip 64 serves to locate the sleeve 60 on the wheel seat 50. Next, the extended outwardly presented surface of the sleeve 60 is ground concentric to the axis of the axle 14 and to a diameter which will create the proper interference fit with the cones 84 of the bearing 80.

Once the mounting sleeve 60 is properly positioned and ground, the inner cone 84 with its cage 90 and roolers 88 is pressed on the sleeve 60 until the cone back face abuts against the flange 62. Thereupon, the wheel hub 100 of the loose wheel 54L, after having the bearing cups 86 pressed into the cup seats 102 and against the cup shoulders 104 thereof, is advanced over the axle 14 until the inner cup 86 engages the rollers 88 of the inner bearing 80. Thereafter the outer cone 84 with its cage 90 and rollers 88, is pressed on the sleeve 60 until the rollers 88 come in contact with the outer cup 86. With outer cone 84 in place, the retaining ring 70 is fastened against the end face of the sleeve 60 with the bolts 68. The adjustment of the bearings 80 is controlled by shims 130 placed between the outer end of the sleeve 60 and the opposite squared off end face on the retaining ring 70, and usually these shims are selected to give the bearings 80 a slight preload. This preload prevents the imposition of excessive forces on the cages 90 as the rollers 88 come into the load zones and also eliminates looseness which may contribute to false brinelling. Finally, the enclosure rings 118 are fastened against the end faces of the hub 100 with the bolts 120.

After the loose wheel 54L is installed on the axle 14, the fixed wheel 54F is pressed over the other raised wheel seat 50 in accordance with conventional assembly procedures. The fixed wheel 54F is advanced over its wheel seat 50 until the proper spacing between the two wheels 54F and 54L exists.

After the wheel and axle set W has been assembled in the foregoing manner, the tapered roller journal bearings 18 are fitted to the axle journals 16 along with their associated components, that is the backing rings 34, the wear rings 32, and the end caps 38, all in accordance with conventional assembly procedures for railcar axles. Lastly, the adapters 20 are placed over the double cups 24 of the tapered roller journal bearings 18, and the wheel and axle set W with the bearings 18 and adapters 20 in place is fitted into the corresponding journal pockets or pedestal openings of the two side frames 10.

Another wheel and axle set W is assembled in the foregoing manner, and that set is installed at the opposite ends of the side frames 10. The two wheel and axle sets W nroamlly have their loose wheels 54L on opposite sides of the truck T.

In operation, the axle 14 rotates in its journal bearings 18 which are positioned in the side frames 10 by adapters 20. On straight segments of track, the loose wheel 54L rotates at the same velocity as the fixed wheel 54F, which is of course the angular velocity of the axle 14. However, when curved segments of track are encountered, the loose wheel 54L will rotate on its bearings 80 relative to the axle 14 to adjust for the difference in distance traveled by the two wheels 54F and 54L in negotiating the curve. Consequently, no slippage occurs between the track rails and the wheels 54F and 54L, and as a result, wear is minimal. The heaviest thrust loading taken by the loose wheel 54L is directed inwardly and toward the fixed wheel 54F. The inwardly directed lip 64 at the outside end of the mounting sleeve 60 prevents the sleeve 60 from moving inwardly should its press fit with the underlying wheel seat 50 be inadequate. Placing the loose wheels 54L of the two wheel and axle sets W on opposite sides of the truck T instead of one the same side results in improved stability, thus minimizing the changes of the truck T jumping the rails on which it rides.

To disassemble the truck T, the wheel and axle sets W are removed from the side frames 10 in the usual manner, and likewise the tapered roller journal bearings 18 are stripped from the axle journals 16 with conventional disassembly tools. In this regard, it should be noted that sufficient clearance exists between the retaining ring 70 attached to the sleeve 60 and the backing ring 34 for the journal bearing 18 to permit the insertion of a pulling tool behind the backing ring 34. This pulling tool, of course, applies an axially directed force to the backing ring 34, and that force dislodges the cones 26 of the bearing 18 from the axle journal 16.

Once the journal bearings 18 are stripped from their axle journals 16, a conventional wheel press is engaged with the flange 62 at the inner end of the mounting sleeve 60, and an axially directed force is applied to the sleeve 60. This force overcomes the interference fit between the sleeve 60 and its wheel seat 50, and accordingly the sleeve 60 slides over the wheel seat 50 and is dislodged therefrom. Upon leaving the wheel seat 50, the sleeve 60 contracts, and this releases the tight fit between the cones 84 of the bearing 80 and the sleeve 60, so that once the retaining ring 70 is detached from the end of the sleeve 60, the sleeve 60 is easily withdrawn from the bearings 80 and particularly the cones 84 thereof.

The wheel press may be used to strip both the loose wheel 54L and the tapered roller journal bearing 18 from the axle 14 in a single operation. In this case, the force for stripping the journal bearing 18 would be transmitted through the sleeve 60 and the retaining ring 70 at the end thereof to the backing ring 34. Of course, the end cap 38 would be removed first.

This invention is intended to cover all changes and modifications of the example of the disclosure which do not constitute departures from the spirit and scope of the invention.

What is claimed is:

1. In a railcar truck having journal bearings at the sides thereof; an improved wheel and axle set comprising: an axle spanning the truck and having journals at its ends which are received by the journal bearings, a fixed wheel mounted in a fixed position on one end of the axle and located inwardly from the journal whereby the fixed wheel always rotates with the axle at the speed thereof; a sleeve press-fitted over and mounted firmly on the opposite end of the axle and located inwardly from the journal on that end; a pair of axially spaced abutments projecting outwardly beyond the outer surface of the sleeve and fixed in position with respect to the sleeve, a loose wheel encircling the sleeve; and bearing means between the loose wheel and sleeve, the bearing means including inner race means fitted around the sleeve and axially positioned by the abutments, outer race means fitted into the wheel, and rolling elements between the inner and outer race means to accept radial loading and thrust loading, whereby the loose wheel may rotate relative to the axle and independent of the fixed wheel.

2. The structure according to claim 1 wherein the abutments are at each end of the sleeve; wherein the abutment at the inner end of the sleeve comprises a flange attached securely to the sleeve; and the abutment at the outer end of the sleeve comprises a retaining ring which is fastened to the sleeve, but is detachable therefrom.

3. The structure according to claim 2 wherein the sleeve has threaded bolt holes opening axially out of the outer end thereof, and the retaining ring is fastened to the sleeve by bolts which thread into the bolt holes.

4. The structure according to claim 1 wherein the bearing means comprises a pair of tapered roller bearings having cones mounted on the sleeve, cups set into the wheel, and tapered rollers interposed between and engaged with raceways on the cones and cups.

5. The structure according to claim 4 wherein the tapered roller bearings are indirectly mounted, whereby the back faces of the cones are presented outwardly and the back faces of the cups are presented inwardly; and wherein the abutments are positioned opposite the cone back faces for locating the cones on the sleeve.

6. The structure according to claim 5 wherein the abutment at the inner end of the sleeve is a flange formed integral with the sleeve and projecting outwardly therefrom; and the abutment at the outer end of the sleeve is a retaining ring fastened to the sleeve such that it can be detached therefrom.

7. The structure according to claim 6 and further characterized by shims between the outer end of the sleeve and the retaining ring to provide proper adjustment of the tapered roller bearings.

8. The structure according to claim 5 wherein the loose wheel has outwardly opening cup seats into which the cups of the bearings are fitted and inwardly directed cup shoulders at the inner ends of the cup seats against which the back faces of the cups are positioned.

9. The structure according to claim 8 and further characterized by enclosure rings detachably fastened to the loose wheel radially outwardly from the cup seats and projecting inwardly therefrom toward the retaining ring and flange at the ends of the sleeve, and elastomeric seals carried by the enclosure rings such that they bear against the outside surfaces of the retaining ring and flange.

10. The structure according to claim 1 wherein the axle has raised wheel seats located inwardly from the journals at the ends thereof; and wherein a mounting sleeve is mounted on one of the wheel seats and the fixed wheel on the other.

11. The structure according to claim 10 wherein the raised wheel seat, on which the sleeve is mounted, outwardly terminates at a shoulder; and wherein the sleeve has an inwardly directed lip at its outer end which engages the shoulder and locates the sleeve on the wheel seat.

12. The structure according to claim 10 wherein the axle has raised wheel seats located inwardly from the journals at the ends thereof; wherein the fixed wheel and mounting sleeve are press fitted over the wheel seats; and wherein the surface of the sleeve on which the bearing cones are to be mounted in ground concentric to the axis of the axle after the sleeve is pressed on the wheel seat.

13. A wheel and axle set for a railcar, said set comprising: an axle having substantially identical wheel seats near the ends thereof; a fixed wheel press-fitted over one of the wheel seats such that the wheel is fixed in position on the axle, whereby the wheel will rotate at the same speed as the axle; a sleeve press-fitted over the other axle seat such that the sleeve is fixed in position on the axle and rotates at the same speed as the axle; abutments projecting outwardly from the sleeve and fixed in position with respect thereto; a loose wheel surrounding the sleeve and adapted to rotate relative thereto, and bearing means between the sleeve and the loose wheel, the bearing means including inner race means fitted around the sleeve and axially positioned thereon by the abutments, outer race means fitted into the wheel and encircling the inner race means; and rolling elements arranged in at least two circular rows between the inner and outer race means to accept radial loading and thrust loading in both axial directions.

14. A wheel and axle set according to claim 13 wherein the sleeve is press fitted over the wheel seat and the abutments are a flange at one end of the sleeve and a detachable retaining ring secured firmly to the sleeve at its other end, the flange and retaining ring projecting radially outwardly beyond the sleeve surface on which the inner race means of the bearing means is mounted.

15. A wheel and axle set according to claim 14 wherein the bearing means comprises a pair of tapered roller bearings in which the inner race means are cones mounted on the sleeve, the outer race means are cups set into the wheel, and the rolling elements are tapered rollers between the cups and cones; and wherein the tapered roller bearings are indirectly mounted with the back faces of the cups presented inwardly and the back faces of the cones presented outwardly and confined by the retaining ring and flange.

16. A wheel and axle set according to claim 15 wherein the wheel seat over which the sleeve is fitted is raised and has a shoulder at its end; and wherein the sleeve has an inwardly directed lip at its outer end, the lip conforming to and seating against the axle shoulder, wherein the lip locates the sleeve on the wheel seat.

17. A wheel and axle set according to claim 15 wherein that surface of the sleeve on which the bearing cones are mounted is ground concentric to the axis of the axle after the sleeve is pressed on the wheel seat.

18. A wheel and axle set according to claim 13 wherein the axle has journal at its ends; wherein the wheel seats are of greater diameter than the journals and have shoulders presented toward the journals; and wherein the sleeve has an inwardly directed lip at its outer end, the lip seating against the axle shoulder of the wheel seat over which the sleeve is fitted, whereby the lip locates the sleeve on the wheel seat.

19. A wheel and axle set for a railcar, said set comprising: an axle having journals at the ends thereof to be received in railcar journal bearings, the axle also having substantially identical wheel seats located inwardly from the journals with the wheel seats being of greater diameter than the journals; a wheel press-fitted over one of the wheel seats such that the wheel is fixed in position on the axle, whereby the wheel will rotate at the same speed as the axle; a sleeve fitted over the other axle seat such that the sleeve is fixed in position on the axle and rotates at the same speed as the axle; the sleeve having an inwardly directed lip at its outer end and the lip being seated against the shoulder on the wheel seat over which the sleeve is fitted, whereby the lip locates the sleeve on the wheel seat; abutments projecting outwardly from the sleeve and fixed in position with respect thereto; a loose wheel surrounding the sleeve and adapted to rotate relative thereto; and bearing means between the sleeve and the loose wheel, the bearing means including inner race means fitted around the sleeve and axially positioned thereon by the abutments, outer race means fitted into the wheel and encircling the inner race means, and rolling elements between the inner and outer race means to accept radial loading and thrust loading in both axial directions.

* * * * *